(12) United States Patent
Dilbeck

(10) Patent No.: US 8,068,020 B2
(45) Date of Patent: *Nov. 29, 2011

(54) MANAGEMENT OF RESOURCES IN EMERGENCY AND OPERATIONAL SITUATIONS

(76) Inventor: Jeremy S. Dilbeck, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/625,389

(22) Filed: Nov. 24, 2009

(65) Prior Publication Data

US 2010/0188205 A1    Jul. 29, 2010

Related U.S. Application Data

(63) Continuation-in-part of application No. 11/609,090, filed on Dec. 11, 2006, now Pat. No. 7,623,027, which is a continuation-in-part of application No. 11/188,394, filed on Jul. 25, 2005, now Pat. No. 7,148,795, which is a continuation of application No. 10/350,833, filed on Jan. 24, 2003, now Pat. No. 6,937,147.

(51) Int. Cl.
*G08B 29/00* (2006.01)
(52) U.S. Cl. .................. 340/506; 340/507; 340/524
(58) Field of Classification Search .................. 340/506, 340/507, 524, 691.6, 3.1, 825.36, 825.49, 340/286.02
See application file for complete search history.

(56) References Cited

U.S. PATENT DOCUMENTS

| | | | | | |
|---|---|---|---|---|---|
| 5,414,408 | A | * | 5/1995 | Berra | 340/525 |
| 5,902,234 | A | * | 5/1999 | Webb | 600/300 |
| 6,496,110 | B2 | * | 12/2002 | Peterson et al. | 340/522 |
| 6,694,234 | B2 | * | 2/2004 | Lockwood et al. | 701/29 |
| 6,694,299 | B1 | * | 2/2004 | Barrer | 705/8 |
| 6,748,052 | B2 | * | 6/2004 | Zellner et al. | 379/45 |

* cited by examiner

*Primary Examiner* — Daryl Pope
(74) *Attorney, Agent, or Firm* — Gregory K. Goshorn; Greg Goshorn, P.C.

(57) ABSTRACT

Provided is a method for designing, managing and executing response plans. Specific plan and resources are defined and a defined plan is executed either automatically or manually according to pre-determined or "real-time" parameter definitions. An executed plan notifies, by various user-defined means, actively or pre-defined parties in a near simultaneous fashion of security communications, notifications, directives and/or information. One embodiment of the system includes a component that requires a notified party to acknowledge a particular notification event by responding with a personal identification number (PIN) or calling a specified telephone number and entering the PIN. The system enables parties to be organized into groups based upon member profiles. Individual parties can be assigned to sub-groups, enabling specifically designed communications to go to the parties of any particular sub-group. Alternative means of contact can be prioritized and utilized either simultaneously or sequentially until contact with a particular party is achieved.

4 Claims, 14 Drawing Sheets

HyperAlert - Your Emergency Communication System — 201

File  Edit  Favorites  Tools  Help — 203

HYPERALERT — 205

User: John Doe
Company: Athena Enterprises, Inc.  home

HOME | LOG OUT | HELP | ADMIN — 207

| STATUS — 209 |
|---|
| ▲ View Current Status — 211 |
| PLANS — 213 |
| ▲ Create New Plan — 215 |
| ▲ View – Edit Existing Plan — 217 |
| DEPLOY — 219 |
| ▲ Select Plan to Deploy — 221 |
| DIRECTORY — 223 |
| ▲ LOCATION PROFILES — 225 |
| ▲ Add – View – Edit Profiles — 227 |
| EMPLOYEE PROFILES — 229 |
| ▲ Add – View – Edit Profiles — 231 |
| EMERGENCY SERVICES — 233 |
| ▲ Add – View – Edit Services — 235 |
| ADDITIONAL RESOURCES — 237 |
| ▲ Add – View – Edit Resources — 239 |
| SCADA Data — 261 |
| Add – View – Edit SCADA — 263 |
| FEMA ICS Forms — 265 |
| Add – View – Edit FEMA — 267 |

STATUS — 241

Sort Data View — 243

Use menus to sort data shown below with the variable in the menus
Arrows change the order of data from ascending to descending Sort by: [No. Employees ▼]  ○ ▲ ● ▼   Then: [Location ▼] ● ▲ ○ ▼   Then: [Select One ▼] ● ▲ ○ ▼   [Sort]

Current Status — 245

● Click on location to view/edit details
● Click on reset to change status

| LOCATION | SECURITY LEVEL | STATUS | NO. EMPLOYEES |
|---|---|---|---|
| Headquarters | 2 | Red Reset Log | 20 |
| Dallas | 1 | Red Reset Log | 11 |
| Lake Titicaca | 0 | Green | 7 |
| London | 0 | Green | 7 |

PLANS — 401

CREATE NEW PLAN — 403
HyperAlert recommends that you give your plan a short, descriptive name that you can easily find and deploy if a situation arises. Use only alphanumeric characters, underscores, and dashes.

① PLAN DETAILS — 405

*indicates a required item* — 407
Plan Name:*  [          ]
Location:*  [<Select> ▼]
○ SCADA Initiated Plan  [<Select> ▼] — 425

② EVENT DETAILS — 409

Event Name:*  [          ] — 411
Type:*  [<Select> ▼]

If this is an auto-mail or call event, please select the accompanying message and recipients:
Create New Message — 413
or
[<Select Existing Message> ▼]

Send Message To: — 415
⦿ Broadcast to all employees at all locations
○ Broadcast to all employees at at
  [<Select> ▼]
○ Send to (ctrl-click to select multiple recipients)
  [All Executive Officers
   All Security Personnel
   All IT Technical Staff
   John Doe]

Please select the person responsible for this event:
Responsible Party:  [<Select> ▼] — 417

Notes/Instructions:  [          ] — 419

Document:  [        ] [Browse] — 421
*Use this field to attach a document that is relevant to this plan*

[Submit & Done] [Submit & Add Another] [Clear] — 423

501 — PLANS

503 — Plan Name: HQ HURRICANE EVACUATION

505 — ADD EVENT TO PLAN

To insert an event between 2 existing events, make new event the same event number as the event you wish to have follow the new event. For example, if you number the event '6', it will be inserted between current events '5' and '6'.

Current Plan Events: — 507
1. Call Senior Personnel
2. Call Law Enforcement Personnel
3. Reverse HOV Lanes On Gulf Freeway

509 — EVENT DETAILS

511 — *\* indicates a required item*
Event Number:\* [2]

513 — Event Name:\* [        ]
Type:\* [<Select> ▼]

If this is an auto-mail or call event, please select the accompanying message and recipients:

515 — Create New Message
or
[<Select Existing Message> ▼]

517 — Send Message To:
○ Broadcast to all employees at all locations
○ Broadcast to all employees at at [<Select> ▼]
○ Send to (ctrl-click to select multiple recipients)
[All Executive Officers
All Security Personnel
All IT Technical Staff
John Doe ▼]

Please select the person responsible for this event:

519 — Responsible Party: [<Select> ▼]
527 —
529 — ● Select Party by GPS Location
● Select Party by Job Function 521 — Notes/Instructons: [        ]

523 — Document: [        ] [Browse]
*Use this field to attach a document that is relevant to this plan*

525 — [Submit & Done] [Submit & Add Another] [Clear]

DIRECTORY
LOCATION PROFILES

Use menus to sort data shown below with the variable in the menus
Arrows change the order of data from ascending to descending Sort by: No. Employees ▼  Then: <Select One> ▼  Then: Select One ▼  Sort
○▲ ⦿▼           ⦿▲ ○▼           ⦿▲ ○▼

Existing Locations

● Click on the Location name to view location details

Create New Locations

| LOCATION | STATUS | | NO. EMPLOYEES | MODIFY | |
|---|---|---|---|---|---|
| Headquarters | Red | Reset | 20 | Edit | Delete |
| Dallas | Red | Reset | 11 | Edit | Delete |
| Lake Titicaca | Green | | 7 | Edit | Delete |
| London | Green | | 7 | Edit | Delete |

DIRECTORY
EMPLOYEE PROFILES

Employee Information — 901

| Name | Location | Email |
|---|---|---|
| John Doe | Headquarters | John_Doe@athena_houston.com |
| 903 | 905 | 907 |

| Address | Emergency Contact | Allergies |
|---|---|---|
| 12100 Elm Street<br>Apt. 203<br>Houston, Texas 77003 | Joe Doe<br>321 Main<br>Austin, TX 78748<br>(512) 555-1234 | Peanuts |
| 909 | 911 | 913 |

| Home Phone | Work Phone | Mobile/Pager |
|---|---|---|
| 281-555-1234 | 713-555-3333 | 800-555-4444 |
| 915 | 917 | 919 |

| Username | Type | Supervisor |
|---|---|---|
| johndoe | Executive Officer | Smith, Joe |
| 921 | 923 | 925 |

| Current GPS Location |
|---|
| 1st and Congress, Austin, TX |
| 929 |

Edit — 927

MANAGEMENT OF RESOURCES IN EMERGENCY AND OPERATIONAL SITUATIONS

CROSS-REFERENCE TO RELATED APPLICATIONS

The present application is a Continuation-in-Part of and claims the benefit of the filing date of the following application with a common inventor:

U.S. patent application Ser. No. 11/609,090, now U.S. Pat. No. 7,623,027, filed Dec. 11, 2006, titled "System and Method for Management of Resources in Emergency and Operational Situations,"

which is a Continuation-in-Part of and claims the benefit of the filing date of the following application with a common inventor:

U.S. patent application Ser. No. 11/188,394, now U.S. Pat. No. 7,148,795, filed Jul. 25, 2005, titled "System and Method for Management of Resources in Emergency Situations,"

which is a Continuation of and claims the benefit of the filing date of the following application with a common inventor:

U.S. patent application Ser. No. 10/350,833, now U.S. Pat. No. 6,937,147, filed Jan. 24, 2003, titled "System and Method for Management of Resources in Emergency Situations."

FIELD OF DISCLOSURE

The invention relates generally to an emergency response system and, more specifically, to a system for the organization, notification and deployment of resources for responding to emergency and operational situations.

BACKGROUND OF THE INVENTION

As national and international events demonstrate, situations, whether man-made or natural, may be inherently chaotic. Regardless of the type of situation (e.g. hurricanes or other severe weather, terrorist attack, fires, explosions or merely operational), resources necessary for an appropriate and timely response need to be identified, notified and deployed in an efficient and timely manner. For example, as a hurricane approaches a coast, it may be necessary to close roads subject to high water, initiate evacuations of people in dangerous areas and put on standby emergency personnel such as ambulance drivers and hospital workers to deal with injuries, police to route and direct evacuation traffic and utility workers to repair damaged electrical lines or water pipes.

Although advance planning for hypothetical situations is often performed, there does not exist, until now, a system that manages the planning, organization, notification of personnel and deployment of resources both before and during a situation. Even the best plans need to be located prior to implementation in order to be effective. This location and implementation of a plan can consume valuable time and, when performed on an ad hoc basis, present a chance of serious omissions and mistakes to occur, including the loss of precious time. In addition, some actions, e.g. the notification of critical personnel, (even if their identification has been performed in advance), typically occurs in a sequential fashion. Thus, there exist many potential sources of error and time loss in current emergency response planning.

SUMMARY OF THE INVENTION

Provided is a system and method for designing, managing and executing one or more response plans. Specific plan and resources are defined in advance and a defined plan is executed either automatically or manually according to pre-determined or "real-time" parameter definitions. The claimed system and method integrate response plans with current telecommunications and Internet technology. In addition to email and telephone telecommunication systems, the disclosed technology is able to employ other types of communication media such as, but not limited to, broadcast radio and walkie-talkies.

An executed plan manually or automatically notifies, by various user-defined means, actively or pre-defined parties in a near simultaneous fashion of security communications, notifications, directives and/or information. One embodiment of the system includes a component that requires a notified party to acknowledge a particular notification event by responding with a personal identification number (PIN) or calling a specified telephone number and entering the PIN. One embodiment enables the setting of the Caller ID field received by the notified party. Setting of a caller ID field may be performed globally or set as a configuration option for particular employees, groups or events.

The system enables responsible parties to be organized into groups based upon member profiles. Member profile information includes one or more means of contact such as, but not limited to, work numbers, home numbers, cellular phones, pagers, email and broadcast and walkie-talkie contact information. In addition, different types of messaging may be provided. For example, a user may select between SMTP and SMS text messaging. Alternative means of contact can be prioritized and utilized either simultaneously or sequentially until contact with a particular party is achieved. Member profiles also include information relevant to potential security concerns. Individual parties can be assigned to sub-groups, enabling specifically designed communications to go to the parties of any particular sub-group. For example, one sub-group may include all parties in a particular geographical region and another sub-group may include all telephone linemen. In this manner, all telephone linemen could be put on alert and all linemen in a particular geographical region can be notified of a particular event and, if necessary, selected linemen dispatched. In addition, positions on emergency teams may be selected based upon job function rather than by employee.

In one embodiment, members within groups may be notified in stages in a "cascade notification" scheme. For example, in the event a notification of an assignment or event is required, a message is sent to a first person in a Group_1, a first person in a Group_2 and a first person in a Group_3. After a period of time, if only the first person in Group_ has acknowledged the message, the message is transmitted to a second person in Group_2 and a second person in Group_3 but to no more persons in Group_1. In this manner, the disclosed technology may simultaneously notify multiple groups while maintaining a sequential notification order, including stoppage, within each group. Cascade notification is applicable to, but is not limited to, the dispatching of employees and the notification of both clients and public users as described below in conjunction with a public access feature.

In one embodiment, Federal Emergency Management Agency (FEMA) forms are incorporated into the communication and response system. In other words, FEMA forms are available and may be completed online. A central database stores and provides access to the forms. In addition, the system may be configured to send relevant notifications when a new form is filed.

In one embodiment, supervisory control and data acquisition (SCADA), which is a technology that monitors and manages physical infrastructure such as pipelines and rail lines, is integrated into the system. Automatic notification and response request are programmed to occur when defined events occur. For example, a SCADA enabled pipeline that detects an unexpected drop in pipeline pressure is able to trigger an emergency response plan provided by the claimed subject matter.

In one embodiment, geographical position information generated by global positioning system (GPS) technology corresponding to employees is automatically monitored, tracked and stored by the system. In this manner, an emergency response may calculate a particular responder most in position to address a specific situation. In an additional embodiment, a map is displayed, a user defines an area on the map and notifications and/or assignments are made based upon users or employees that may be assigned to work in the defined area, reside in the defined area and/or whose GPS locators indicate are currently in the defined area.

In one embodiment, a "Public Access" module is provided. A client may create a list of subjects and a public user can, using a web interface, register for notifications of events corresponding to a particular subject. For example, a bus company may list each of a number of different defined routes as a particular subject and provide information corresponding to the different subjects. A potential bus rider may then register to receive notifications about a particular route. Typically, the public user creates a profile that includes, but is not limited to, contact information and preferences and particular subjects of interest.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 2 is a diagram of an exemplary top-level access screen of the disclosed system.

FIG. 4 is a diagram of an exemplary frame that enables a user to create a new emergency plan.

FIG. 5 is a diagram of an exemplary frame that enables a user to add a new event to an existing emergency plan.

FIG. 7 is a diagram of an exemplary frame that displays information on existing business locations.

FIG. 9 is a diagram of an exemplary frame that displays employee or other personnel information.

DETAILED DESCRIPTION OF THE FIGURES

Although described with particular reference to an emergency response system, the system and method of the present invention can be implemented in any system in which the definition, organization and execution of action plans is desirable. For example, the claimed subject matter is not merely suitable for responding to an emergency situation but may also be applied to operations situations. Those with skill in the computing arts will also recognize that the disclosed embodiments have relevance to a wide variety of computing platforms in addition to those described below. In addition, the response of the present invention can be implemented in software, hardware, or a combination of software and hardware. The hardware portion can be implemented using specialized logic; the software portion can be stored in a memory and executed by a suitable instruction execution system such as a microprocessor.

In the context of this document, a "memory" can be any means that can contain, store, communicate, propagate or transport the program and/or data for use by or in connection with an instruction execution system, apparatus or device. Memory can be, but is not limited to, an electronic, magnetic optical, electromagnetic or semiconductor system, apparatus or device. Memory also includes, but is not limited to, for example the following: a portable computer diskette (magnetic), a random access memory (RAM), a read-only memory (ROM), an erasable programmable read-only memory (EPROM or flash memory), and a portable compact disc read-only memory or another suitable medium upon which the program is stored.

Figure 1:
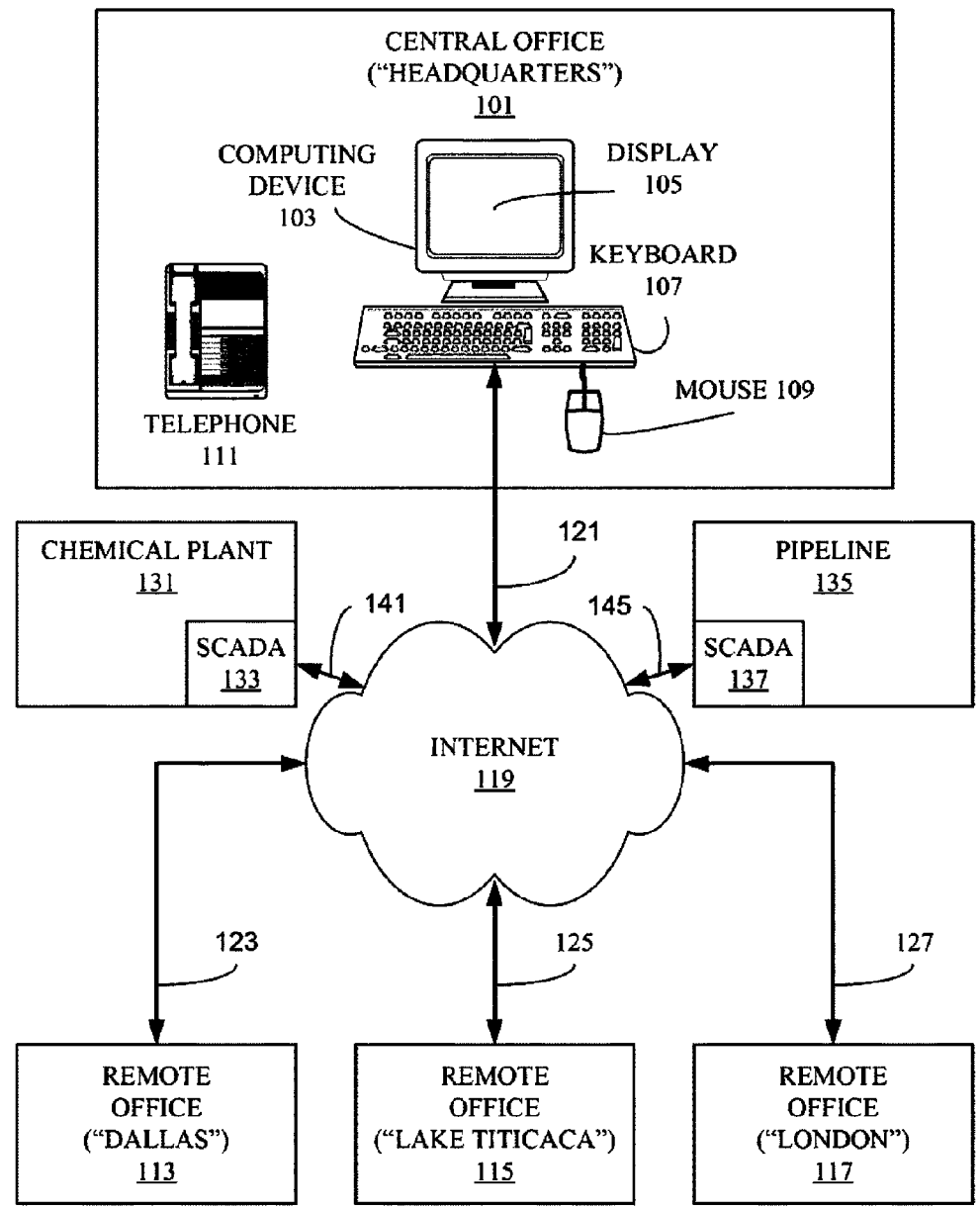
FIG. 1 is a block diagram of one example of a central office/remote office architecture for implementing the claimed subject matter.

FIG. 1 is a block diagram of one example of a central office/remote office architecture 100 for implementing the claimed subject matter. A central office 101, or "Headquarters," is communicatively coupled to a remote office 113, or "Dallas," a remote office 115, or "Lake Titicaca," and a remote office 117, or "London." Headquarters 101 is connected to the Internet 119 via a communication links 121. Dallas 113, Lake Titicaca 115 and London 117 are connected to the Internet 119 via communication links 123, 125 and 127, respectively. Of course, specific locations are used only as examples and the claimed subject matter is applicable to systems deployed in a variety of situations, e.g. globally, within one or more cities, states or countries, and within one or several buildings, either in close geometric proximity or at a distance from one another. The specific architecture 100 is used only as an example in order to facilitate the description of the claimed subject matter.

Also illustrated are examples of physical infrastructure that may be incorporated into the claimed subject matter. In this example, a chemical plant 131, which includes supervisory control and data acquisition (SCADA) technology 133, and a pipeline 135, which includes SCADA technology 137 communicate with system 100 via communication links 141 and 145, respectively.

In this example, communication links 121, 123, 125, 127, 141 and 145 are implemented via the Internet 119 but could instead be connected by any combination of public or private communication systems such as a plain old telephone system (POTS), microwave systems, satellite communication systems or radio broadcast systems. In addition, the communication links 121, 123, 125, 127, 141 and 145 may be dedicated links or established at particular times or when one office has a need to communicate with another office.

The central office 101 includes a computing device 103 for executing the claimed subject matter. The computing device 103 includes a display 105, a keyboard 107 and a mouse 109 for enabling human interaction with the computing system 103. Central office 101 also includes a telephone 111 for sending and receiving communication via the POTS. Those with skill in the computing and/or communication arts should realize there are many communication media suitable to implement the claimed subject matter. For example, communication media utilize by system 100, including communication to and from responders and employees, may include, but are not limited to, email and telephone telecommunication systems, broadcast radio and walkie-talkies. Those with skill in the computing arts should be familiar with the computing device 103 and the telephone 111. Remote offices 113, 115 and 117 include computing devices and telephones (not shown) similar to computing device 103 and telephone 111. In the alternative, the claimed subject matter may be implemented on a variety of computing platforms.

In the disclosed embodiment, the computing device 103 at Headquarters 101, as well as the computing devices at remote locations 113, 115 and 117, execute software that implement the claimed subject matter. An authorized user can manage the system from any of the locations 101, 113, 115 and 117 and/or using a computing device communicatively coupled to the HyperAlert system. In an alternative embodiment, a security manager or other authorized employee or personnel has the capability to place call to the HyperAlert System from a telephone or other communication device and launch an response plan or perform any of the other functions by entering a code or series of codes.

FIG. 2 is a diagram of an exemplary top-level access screen 200 of the disclosed system. The screen 200 is displayed on display 105 by the HyperAlert system executing on computing device 103 (FIG. 1). A title bar 201 provides information on the HyperAlert system. In this example, the screen 200 is displayed through a web browser such as Microsoft Explorer, published by the Microsoft Corporation of Redmond, Wash. and the connection 121 is provided by an Internet service provider (ISP). A toolbar 203 provides options that should be familiar to users of the Windows operating system, also published by the Microsoft Corporation. A title bar 205 provides the name of the company that publishes HyperAlert software, HyperAlert of Houston, Tex., and the name and company of the user of the software, a hypothetical John Doe of Athena Enterprises, Inc. Several buttons 207 enable a user to navigate to a home page, log out of the system, access a help system and perform administrative functions. Those with experience in the computing arts should be familiar with this type of graphical user interface (GUI) and its manipulation by means of keyboard 107 and mouse 109.

Positioned down the left side of the screen 200 are a "Status" heading 209, a "Plans" heading 213, a "Execute" heading 219 and a "Directory" heading 223. Each of the headings 209, 213, 219 and 223 provide options: the Status heading 209 provides a "View Current Status" button 211; the Plans heading 213 provides a "Create New Plan" button 215 and a "View-Edit Existing Plan" button 217; the Execute heading 219 provides a "Select Plan to Execute" button 221; and the Directory heading 223 provides a "Location Profiles" subheading 225, an "Employee Profiles" subheading 229, an "Emergency Services" subheading 233, an "Additional Resources" subheading 237, a "SCADA Data" subheading 261 and a "Federal Emergency Management Agency (FEMA) Incident Command System (ICS) Forms" subheading 165. Location Profiles and Employee Profiles subheadings 225 and 229 each provide an "Add—View—Edit Profiles" button 227 and 231 respectively. Emergency Services subheading 233 provides an "Add—View—Edit Services" button and Additional Resources subheading 237 provides an "Add—View—Edit Resources" button 239. SCADA Data subheading 261 provides an "Add—View—Edit Resources" button 263. FEMA ICS Forms subheading 265 provides an "Add—View—Edit FEMA" button 267. The meaning and functionality of headings and subheadings 209, 213, 219, 223, 225, 229, 233 and 237 and buttons 211, 215, 217, 221, 227, 231, 235 and 239 are described in more detail below in conjunction with FIGS. 3-14.

SCADA Data subheading 261 and corresponding button 263 are associated with information received from SCADA modules such as SCADA module 133 (FIG. 1) of chemical plant 131 (FIG. 1) and SCADA module 137 (FIG. 1) of pipeline 135 (FIG. 1). Particular information received via a SCADA module such as modules 133 and 137 may be configured to initiate actions such as the generation of reports, notification of employees and the initiation of an emergency response plan. FEMA ICS Forms subheading 265 and corresponding button 267 are associated with the generation, storage and transmission of FEMA ICS forms. FEMA ICS forms, which are typically shared by facsimile, may be generated online and stored in memory associated with computing device 103. In addition, the claimed subject matter provides the ability to define actions corresponding to the generation of FEMA ICS forms, such as, but not limited to, the sending of notifications or the automatic initiation of an emergency response plan. In an alternative embodiment, there is also a "Reporting" heading with associated buttons associated with subheadings 261 and 263, which enable a user to generate reports such as, but not limited to, reports on emergency simulations, response times, system failures, and so on.

In screen 200, the View Current Status button 211 under the Status heading 209 has been activated, as can been seen by a "Status" title 243 and a "Current Status" data display 247 in a frame 241 of the access screen 200. Current Status data display 247 includes information on various business locations, e.g. Headquarters 101, the Dallas office 113, the Lake Titicaca office b and the London office 117 (see FIG. 1). In this example, the View Current Status 211 button is the default display for displaying information in the frame 241 when the HyperAlert system is first activated. The names in the Location column 249 are underlined to indicate that, if the user clicks on a particular name, a location profile is displayed with information about that particular location.

The Current Status data display 247 includes four (4) columns: a "Location" column 249, a "Security Level" column 251, a "Status" column 253 and a "Number of Employees" column 255. The Location column 249 displays the names of the various offices 101, 113, 115 and 117. The Security Level column 251 displays each office's corresponding security level, with a higher number indicating a greater level of emergency or activity. The Status column 253 indicates whether or not a particular office is currently experiencing an emergency or is in the process of executing an emergency plan. For example, the London office 117 and the Lake Titicaca office 115 each have a corresponding status of "Green" indicating that no emergency plans are currently being executed in those particular offices. Headquarters 101 and the Dallas office 113 each have a status of "Red" indicating that emergency plans have been executed and are in progress or that an emergency plan has been executed at that site, usually in the recent past, and a security manager has not yet reset the status of the system to "green." If an authorized user places a cursor (not shown) over a "Reset" button in the Status column 253 and clicks with the mouse 109 (FIG. 1), then the corresponding Status display changes from a status of "Red" to a status of "Green." It should be noted that this clicking on the Reset button 253 only changes the Current Status data display 247 and the log of the most recent or ongoing plan execution is no longer available via the Log button 253. The actual status of a plan cannot be changed unless the plan has completed or an authorized user has stopped the plan from executing by clicking a "Stop Execution" button 1105 (see FIG. 11). The underlined terms "Log" in the Status column 253 provide the user with access to a log file corresponding to the executed plan. In alternative embodiments, there is either a single log file for the HyperAlert system or for each business location. A log file contains information on a corresponding location such as, but not limited to, the time, date and initiator of specific events such as the execution of a plan or event associated with a plan. The No. Employees column 255 displays the number of stored employee profiles that have the corresponding location listed as a particular employee's location.

In addition to the Status title bar 243 and the Current Status data display 247, the frame 241 includes a "Sort Data View" box 245 in which the user is able to define how the information in the Current Status data display 247 is sorted. In this example, the data is sorted first by the numbers in the No. Employees column 255, in descending order, and then alphabetically by the location names in the Location column 249 in ascending order. A "Sort" button in the box 245 initiates the sorting process.

Figure 3:
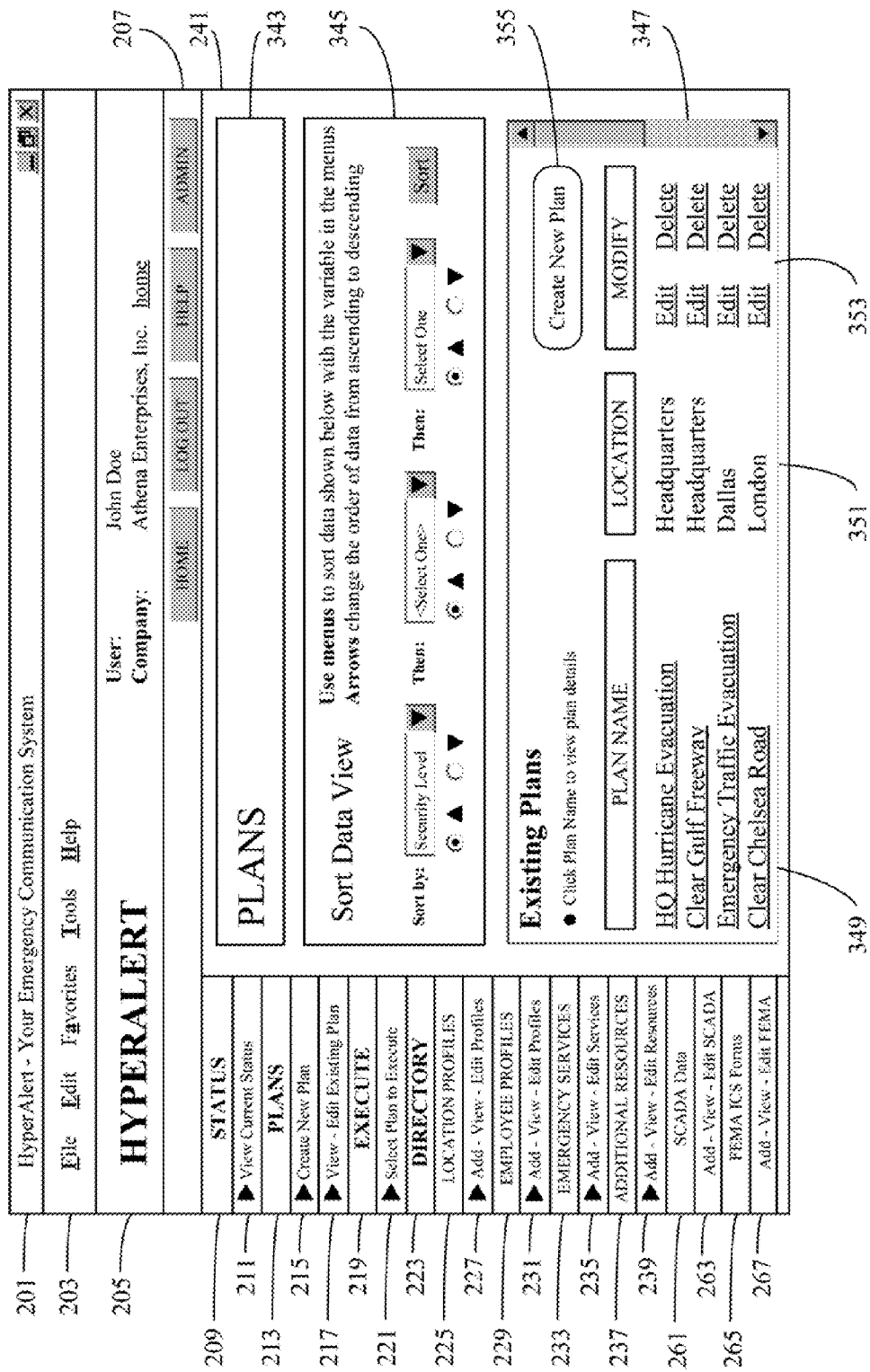
FIG. 3 is a diagram of the top-level access screen of FIG. 3 with a frame displaying information on emergency and operational plans.

FIG. 3 is a diagram of the top-level access screen 200 of FIG. 2 with the frame 241 displaying information on defined emergency plans. A "Plans" title bar 343 and an "Existing Plans" data display 347 are displayed in the frame 241 in response to a mouse 109 click on the View—Edit Existing Plan button 217 or a click on the Plans header 213. As in FIG. 2, a Sort Data View box 345, similar to Sort box 245 (FIG. 2) enables the user to select how the information in the display 347 is sorted. In this example, data in the Existing Plans data display 347 is sorted by a security level corresponding to a particular location.

The Existing Plans data display 347 includes three (3) columns: a "Plan Name" column 349; a "Location" column 351; and a "Modify" column 353. In this example, the Plan Name column 349 has enough space to display four (4) particular predefined emergency plans: a "HQ Hurricane Evacuation" plan; a "Clear Gulf Freeway" plan; a "Emergency Traffic Evacuation" plan; and a "Clear Chelsea Road" plan. Plan names are underlined, indicating that, if a user clicks on a particular name, information about the corresponding plan is displayed. A scroll bar on the right of the Existing Plans data display 347 indicates that there are additional plans not displayed in the frame 241. Location column 351 displays the particular business location to which a corresponding emergency plan is applicable. For example, the HQ Hurricane Evacuation plan is designed for the Headquarters location. Modify column 353 provides two (2) buttons in each row, one for editing the corresponding emergency plan and the second for deleting the plan. A Create New Plan button 355 displays a data entry screen (not shown) that enables an authorized user to create a new emergency plan by providing necessary information, as explained below in conjunction with FIG. 4.

FIG. 4 is a diagram of an exemplary frame 400 that enables a user to create a new emergency plan. As explained above, although the following description is focuses on planning for an emergency situation, the claimed subject matter is equally applicable to operation situations. Frame 400 is displayed in response to a click on the one of the Create New Plan buttons 215 (FIG. 2) or 355 (FIG. 3). A title bar 401 indicates the frame 400 as a "Plans" frame and a tile bar 403 indicates that the frame 400 is used for creating a new emergency plan. A "Plan Details" data entry section 405 includes data entry boxes 407 that enable an authorized user to define the new plan's name and the location to which it applies. Data entry section 405 also includes a "SCADA Initiated Plan" radio button and selection box 425 that enables the authorized user to correlate the defined plan to a particular SCADA event, e.g. a drop in pipeline pressure transmitted by SCADA module 137 (FIG. 1). In other words, the occurrence of the particular SCADA event causes the corresponding plan to be initiated.

An "Event Details" data entry section 409 includes data entry areas 411, 413, 415, 417, 419 and 421. Data entry boxes 411 enable the authorized user to define a plan name and a "type" of plan. In this embodiment, different types of plans include "Call/Send," "Read," "Monitor," "Launch Crisis Center," and "Manual" events. The different types of events are described in more detail below. Data entry area 413 enables the user to either create a new message or select a message from a predefined list of messages. Data entry area 415 enables the user to specify the intended recipient(s) of the message defined in data area 413. By selecting a particular radio button, the user chooses whether to send the message to all employees, to specified groups of employees or to one or more selected individuals or contacts. A data entry box 417 enables the selection of a particular party responsible for the new event. A data entry box 419 enables the user to specify written text to accompany the corresponding event notification when the new plan is executed. A document data entry area 421 enables the user to specify, for example in a Call/Send event, a particular computer file to include with the notification. In a Read event, the data entry area 421 enables the user to specify a particular computer file for review as an event of the corresponding plan. In a Read event, the attached file might be, for example, a document for review by a security manager. In a Manual event, the attached file might be a predefined public relations document for releasing to the media. Those with skill in the computing arts should recognize a "Browse" button in the data entry area 421 as providing a window that enables the user to select a document via a selection window. Examples of files that may be attached in data entry area 421 are such things as relevant maps, contact lists, equipment manuals, and so on.

In one embodiment, members within groups may be dispatched and/or notified in stages in a "cascade notification" scheme. For example, in the event a notification of an assignment or event is required, a message is sent to a first person in a Group_1, a first person in a Group_2 and a first person in a Group_3. After a period of time, if only the first person in Group_ has acknowledged the message, the message is transmitted to a second person in Group_2 and a second person in Group_3 but to no more persons in Group_1. In this manner, the disclosed technology may simultaneously notify multiple groups while maintaining a sequential notification order, including stoppage, within each group. Cascade notification is applicable to, but is not limited to, the dispatching of employees and the notification of both clients and public users as described below in conjunction with a public access feature.

Three (3) buttons 423 at the bottom of the frame 400 are a "Submit & Done" button, a "Submit & Add Another" button and a "Clear" button. The Submit & Done button stores the new plan in memory; the Submit & Add button stores the new emergency plan in memory and then display an "Add Event to Plan" frame 500 (see FIG. 5), which enables the user to define another event associated with the new plan. A particular emergency plan may have one or multiple events associated with it and an event may be something as simple as a notification of a particular employee.

FIG. 5 is a diagram of an exemplary Add an Event frame 500 that enables a user to add a new event to an existing emergency plan. Frame 500 is displayed in response to a click on the Submit & Add Another button 423 (FIG. 4). A title bar 501 indicates that frame 500 is associated with emergency plans. A "Plan Name" title bar 503 indicates that the new event that is being created in this example is associated with the HQ Hurricane Evacuation emergency response plan. Text 505 indicates that frame 500 is for the purpose of adding an event to a plan and provides some instruction on how to insert an event between two existing events. A "Current Plan Events" list box 507, with scroll bar, displays the predefined, or existing, events associated with the subject plan, i.e. a "Call Senior Personnel" event; a "Call Law Enforcement" event; and a "Reverse HOV Lanes On Gulf Freeway" event.

A title bar 509 heads a section with multiple user data entry sections 511, 513, 515, 517, 519, 521 and 513 that enable a user to define the new event. Text boxes 511 enable the user to assign a number and a name to the new event. The event number provides the user the ability to control the order in which the events associated with a particular plan are executed when the plan is executed. A "Type" selection box 513 enables the user to define the type of event. Examples of possible event types include a "Call/Send" type, e.g. which telephones, emails, broadcasts media or walkie-talkie information corresponds to a particular person or group of people, a "Read" event, which provides a document for review by a person such as a security manager or other employee, a "Monitor" event, which serves as a reminder to manage a situation or ascertain the status of a situation, a "Launch Crisis Center" event, which creates and display a secondary Crisis Center window for a corresponding plan (see FIG. 11), and a "Manual" event, which is an event requiring physical action on the part of an employee such as the security manager or their delegate. A Manual event may include a checkbox so that the employee can indicate that the necessary action has been initiated or completed.

A data entry area 515 enables the user to either create a message associated with the new event or select a message from a list of predefined messages. A series of radio buttons 517 enable the user to define to which particular contacts the message defined in data entry area 515 is sent. A selection box 519 enables the user to select a person that is responsible for the new event. The names displayed in the selection box 519 may be a list of all employees, a defined subset of employees, or from a separate list of possible supervisors. A "Select Party by GPS Location" radio button 527 enables a responsible party to be defined as the person closest to the corresponding emergency. In other word, GPS technology is employed to track employees and location information is utilized by the system to determine which employee is in the best geographical position to respond to a particular emergency. In an additional embodiment, a map is displayed, a user defines an area on the map and notifications and/or assignments are made based upon users or employees that may be assigned to work in the defined area, reside in the defined area and/or whose GPS locators indicate are currently in the defined area. A "Select Party by Job Function" radio button 529 enables a responsible party to be defined as anyone that fits a specific job description. Of course, buttons 527 and 529 may both be set so that the system determines the closest person who fits a particular job description.

A text box 521 enables the user to define notes or instructions to attach to the event and a text box 523 enables the user to attach a preexisting document to the event. Some examples of documents that might be attached include a relevant map, documentation for a particular piece of equipment and/or a contact list. Examples of a message that might be attached in text box 521 include, but are not limited to, a note as to where a particular equipment manual or map may be located. A "Browse" button associated with the text entry bow 523 should be familiar to those with experience with the Windows GUI. At the bottom of frame 500 are three (3) buttons 525 that enable the user to store the new event, store the new event and then define another event, or clear all the information already stored in the frame 500 and start over.

Figure 6:
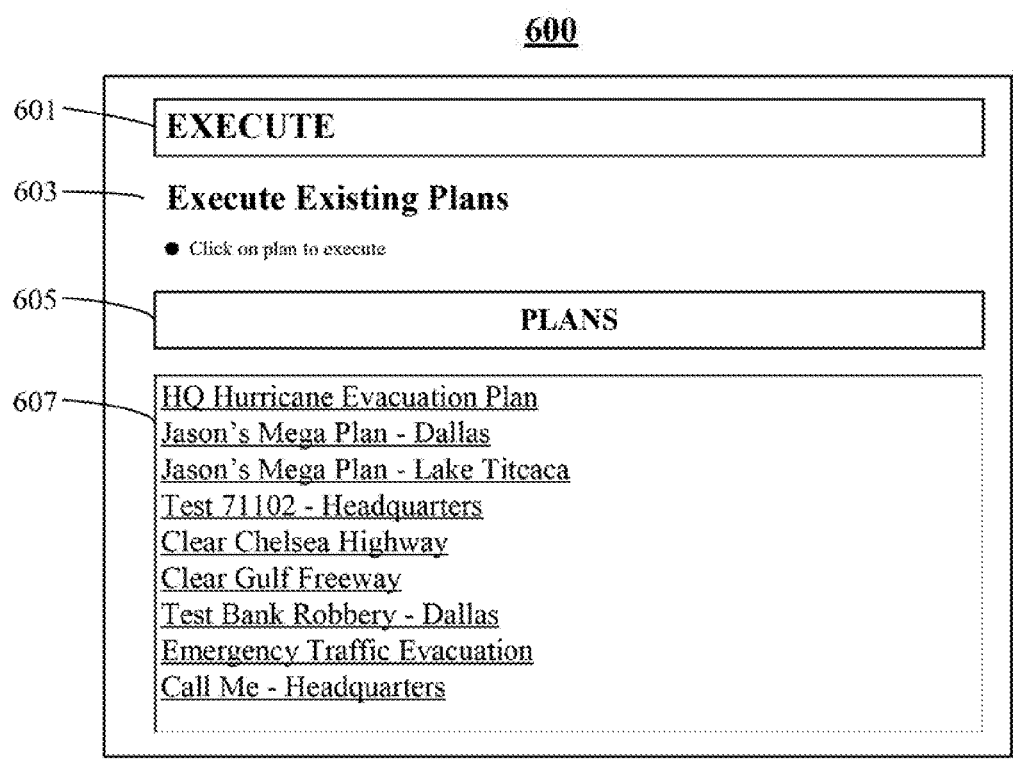
FIG. 6 is a diagram of an exemplary frame that displays information on emergency plans ready for execution.

FIG. 6 is a diagram of an exemplary "Execute" frame 600 that displays information on emergency plans ready for execution. The frame 600 is displayed in response to click on the Execute button 221 or header button 219 (FIG. 2). Title bars 601, 603 and 605 indicate frame 600 is related to the execution of an emergency response plan and instructs the user to click on a particular plan that the user intends to execute. A list box 607 displays the names of available, or predefined, emergency plans. Of course, if there are more plans than would fit in the displayed portion of frame 600, a scroll bar (not shown) is provided at the right edge of the list box 607. In this example, a few of the available plans are the HQ Hurricane Evacuation plan, a "Jason's Mega Plan—Dallas" and a "Jason's Mega Plan—Lake Titicaca." The plan names are underlined to indicate that the user may click on the plan in order to execute the corresponding plan. Once the user executes a particular plan, a series of confirmation prompts (not shown) are displayed. First, the user is asked to confirm via "Yes" and "No" radio buttons the plan execution. Next, the user may be required to enter an authorization code and/or a password.

FIG. 7 is a diagram of an exemplary "Locations Profile" frame 700 that displays information on existing business locations in frame 241 of the page 200 (FIG. 2). Frame 700 is displayed in response to a click on the Add—View—Edit Profiles button 227. An "Existing Locations" list box 747, with scroll bar, displays the names of predefined locations such as Headquarters 101, Dallas 113, Lake Titicaca 115 and London 117 (FIG. 1). Columns 749, 751, 753 and 755 provide information about a corresponding location. "Location," "Status" and "No. Employees" columns 749, 751 and 753 are similar to columns 249, 253 and 255 respectively (FIG. 2). Clicking on a particular location in column 249 displays a "Locations Profile" data frame 800 (see FIG. 8). The "Modify" column 755 provides buttons to enable the user to edit or delete information on the corresponding location in a data entry frame similar to data frame 800. A "Create New Locations" button 757 displays a "Locations Profiles" data entry frame similar to data frame 800 that enables the user to enter information on a new location. A "Sort" area 745, similar in function to Sort area 245 (FIG. 2) enables the user to select the order in which to display the information in columns 749, 751, 753 and 755.

Figure 8:
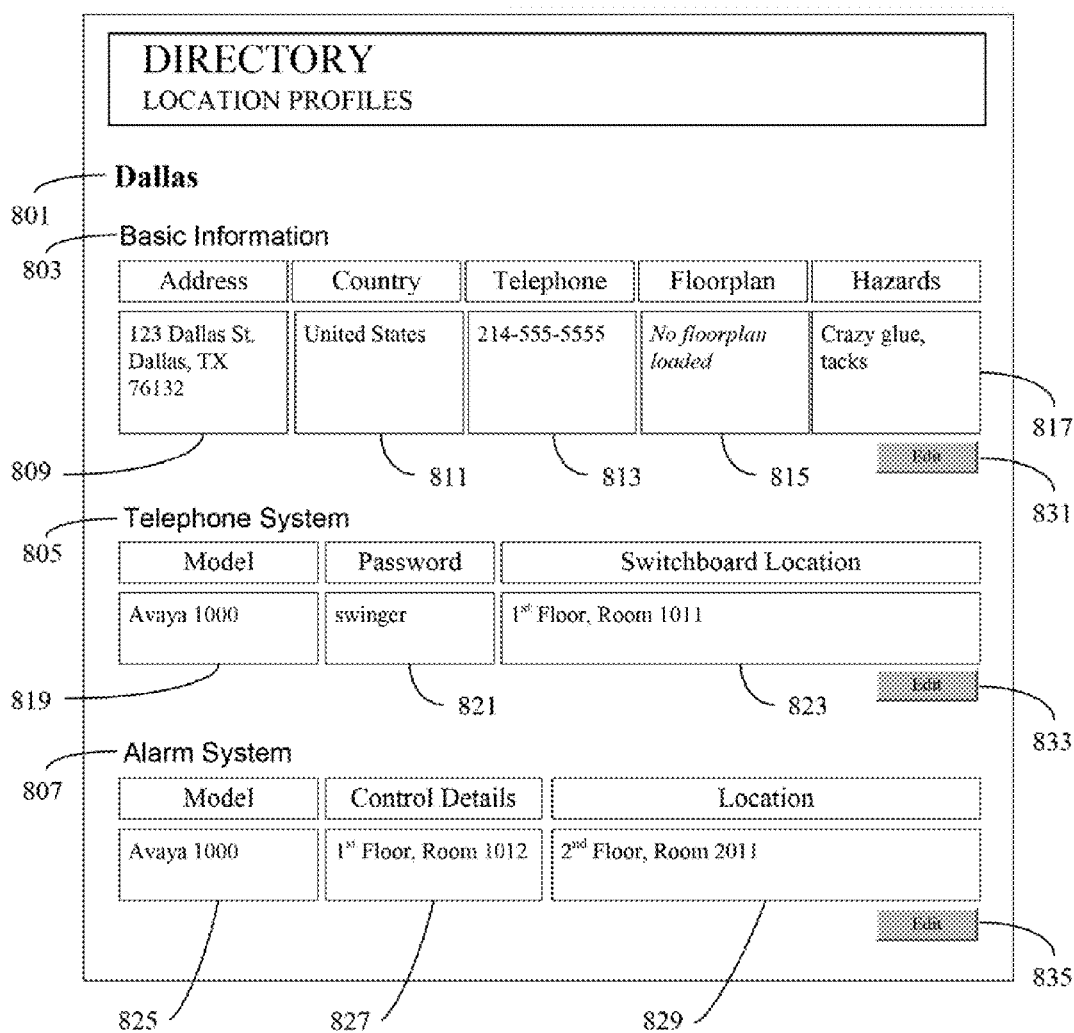
FIG. 8 is a diagram of an exemplary frame that displays location information for the city of Dallas, Tex.

FIG. 8 is a diagram of an exemplary "Locations Profiles" data entry frame 800 that displays location information for one of the locations, e.g. the city of Dallas, Tex. Frame 800 is displayed in response to a click on one of the Edit buttons 755 (FIG. 7). In this example, frame 800 includes the name of the location 801 and basic information 803, which includes an address 809, a country 811, a telephone number 813, the location of a floor plan 815 and a list of any particular hazards 817 associated with this location. The floor plan column 815 may provide information as to where a floor plan is stored either physically or electronically or provide a link to the information.

A "Telephone System" area 805 provides information on the location's telephone system, including a model name 819, a password 821 and a location of the switchboard 823. An "Alarm System" area 807 provides information on the location's alarm system, including a model 825, location of information on control details 827 and a location 829. "Edit" buttons 831, 833 and 835 enable the user to modify the information in the data displays 809, 811, 813, 815, 819, 821, 823, 825, 827 and 829. It should be noted that the information included in FIG. 8 is only an example of the types of and specific information that may be included in frame 800.

FIG. 9 is an exemplary "Employee Profile" frame 900 that displays information on a specific employee. Another Employee Profile frame (not shown), similar in purpose to Location Profile frame 700 (FIG. 7), enables the user to select and sort a list of current employees and to select a particular employee's information to display in frame 900. Specific employee information 901 in this example includes a name 903, a location 905, an email address 907, an address 909, an emergency contact 911, any allergies 913 that the particular employee might have, a home telephone number 915 a work number 917, a mobile or pager number 919, a computer user name 921, a type of employee 923, a name of an immediate supervisor 925 and a current GPS location 929 as determined by GPS technology. It should be noted that in addition to maintaining location information on employees, GPS technology may be employed to locate, track and dispatch resources such as, but not limited to, equipment and vehicles necessary for implementation of an emergency response plan. In an additional embodiment, a map is displayed, a user defines an area on the map and notifications and/or assignments are made based upon users or employees that may be assigned to work in the defined area, reside in the defined area and/or whose GPS locators indicate are currently in the defined area. The name of the supervisor 925 is underlined indicating the user can click on the name 925 to display similar employee information on the corresponding supervisor. It should be noted that the information included in FIG. 9 is only an example of the types of and specific information that may be included in frame 900.

Frame 900 is reached from an employee profile frame (not shown), similar to the location profile frame 700 (FIG. 7), which displays a list of all employees and provides a button to display a data entry screen that enables the user to create a record for a new employee. It should be noted that although the description often employees "security managers" and "employees" as examples both of these classifications are used for example only and both the frame 900 and the system as a whole may be applied to any type of personnel, whether employed by the system operator or not.

Figure 10:
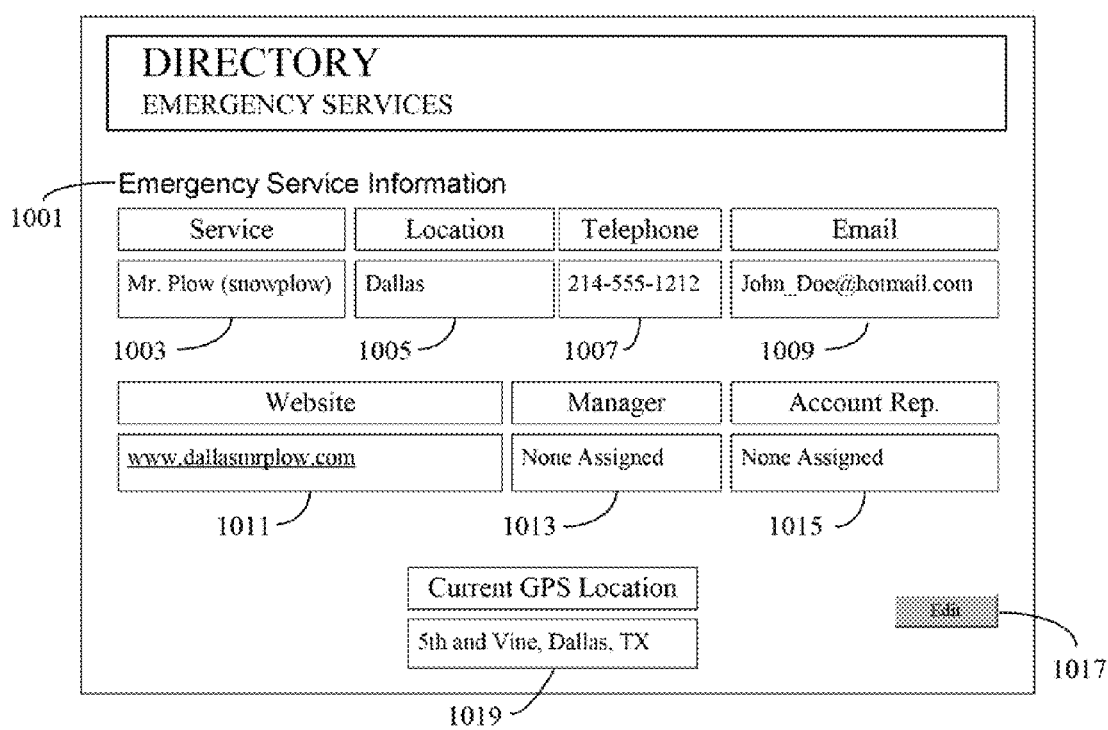
FIG. 10 is a diagram of an exemplary frame that displays emergency services information.

FIG. 10 is an exemplary frame 1000 that displays emergency services information 1001. Included in the emergency service information is a name of the service 1003, a location 1005, a telephone number 1007, an email address 1009, a website address (if available) 1011, the name of a manager 1013, the name of an account representative 1015 and a current GPS location 1019 as determined by GPS technology.

Of course, the service specified by frame 1000 may have many resources such that GPS location 1019 would be a list of locations and corresponding resources at those locations. The website address 1011 is underlined to indicate that the user can click on the address 1011 to display a frame with the corresponding website displayed. An Edit button 1017 enables the user to change the fields 1003, 1005, 1007, 1009, 1011, 1013 and 1015. A Create New Service button 1019 enables the user to display a data entry frame (not shown) for defining information relating to a new service.

Frame 1000 is reached from an emergency services profile frame (not shown), similar to the location profile frame 700 (FIG. 7), which displays a list of all currently stored emergency services and provides a button to display a data entry screen that enables the user to create a record for a new service. One example of emergency services information is the number for a poison control hotline.

An Additional Resources frame (not shown), which has a similar look and functionality as the Emergency Services frame 1000, is displayed when the user clicks on one of the buttons 237 or 239 (FIG. 2). Additional resources may include information such as, but not limited to, insurance agent contact numbers.

Figure 11:
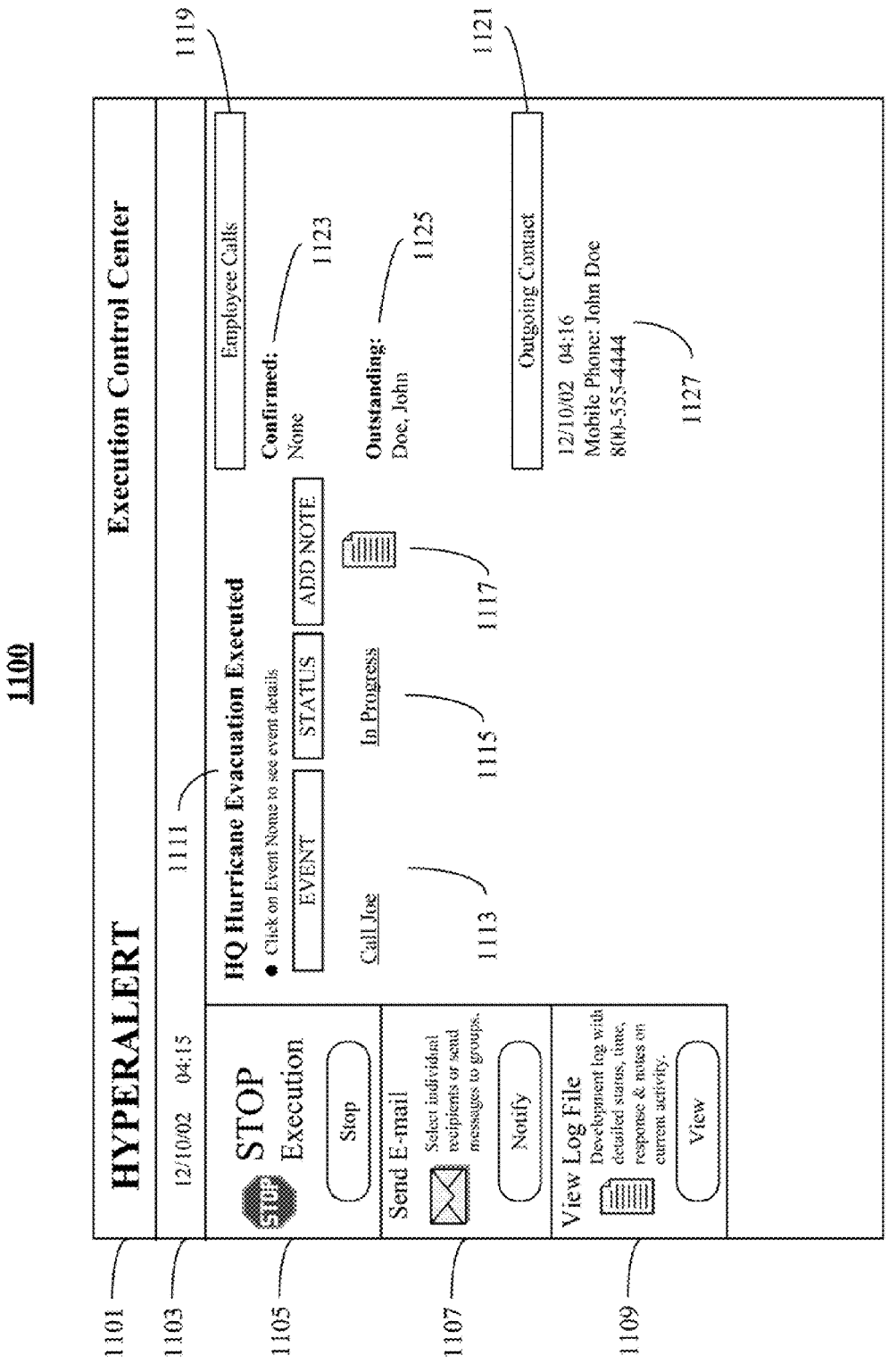
FIG. 11 is a diagram of an exemplary frame that displays an Execution Control Center.

FIG. 11 is a diagram of an exemplary "Execution Control Center" 1100. Of course, the disclosed embodiment is "web enabled" so that the Control Center 1100, or any of the frames and screens illustrated above, can be displayed on any computer connected to the Internet or otherwise connected to the HyperAlert system. A title bar 1101 displays the provider and the title of the frame 1100. A status line 1003 displays the current time and date. Three buttons down the left side, a "Stop Execution" button 1105, a "Send Email," or "Notify," button 1107 and a "View Log File" button 1109, enable the user to take various actions with respect the particular emergency response plan, in this example, the HQ Hurricane Evacuation plan.

A data area 1111 indicates that the HQ Hurricane Evacuation plan has been executed. An "Event" column 1113 displays the particular event or events associated with this plan (in this example, a Call Joe event); a "Status" column 1115 indicates that the corresponding event is "In Progress;" Other types of status include "Not Started, "Completed" and "Halted." A status of "Halted" corresponds to a plan that has been stopped while "In Progress" and has not yet reached a status of "Completed." The events are ordered from top to bottom in chronological order of execution, for example, the first event may be "In Progress" while the second event is "Not Started." Some events may also be contingent upon other events, i.e. the contingent event is only executed upon completion of another event. For example, a event that contacts employees may be contingent upon an event that contacts senior personnel.

An "Add Note" column 1117 displays an icon for enabling the user to log information relating to the corresponding event. An "Employees Calls" data area 1119 displays information on the status of current attempts to contact particular employees, contacts or services. The Employees Calls data is broken down into a "Confirmed" area 1123 and an "Outstanding" area 1125. Employees listed in the Outstanding area 1125 are currently in the process of being contacted and have not responded with a confirmation. Employees listed in the Confirmed area have been contacted and have responded with a confirmation code. An "Outgoing Contact" area 1121 displays current contact information 1127 on employees listed in the Outstanding area 1125 in the event the user monitoring the Execution Control Center 1100 chooses to initiate additional attempts to contact the relevant employee.

Two additional categories of employee call data are "Outstanding—Off-Duty" and "Confirmed—Needs Assistance." Employees with a status of "Outstanding—Off-Duty" are those employees who have not responded to an attempted contact and whose profile indicates are typically not on duty at the time the plan was executed. This information enables a security manager to respond based on the risk that the employee may not be able to be contacted. A status of "Confirmed—Needs Assistance" indicates that the particular employee has received a message but requires assistance. Any particular implementation of the HyperAlert system may or may not include these specific categories or, in the alternative, define and include other categories. Any additional categories, like Confirmed—Need Assistance and Outstanding—Off-Duty, are also broken down and displayed in data area 1119.

Figure 12:
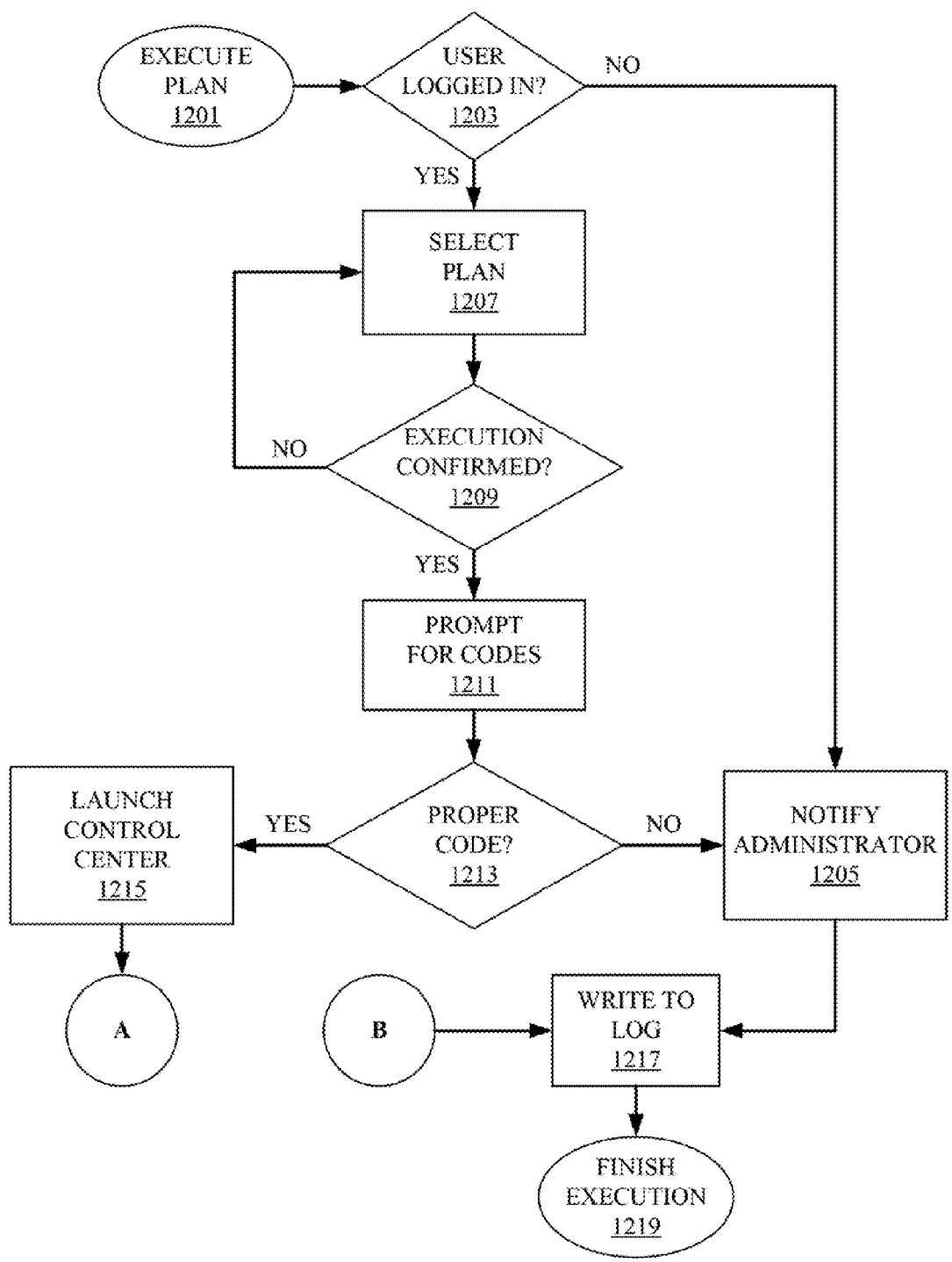
FIG. 12 is a flowchart illustrating the execution of an emergency response plan.

FIG. 12 is a flowchart 1200 illustrating an execution of an emergency response plan. Control begins in an "Execute Plan" step 1201 and proceeds immediately to a "User Logged In?" step 1203. If the user is not logged into the system or does not have the appropriate authority to execute emergency response plans, then control proceeds to a "Notify Administrator" step 1205 in which a message or an automated call is made to the appropriate administrator, indicating that an unauthorized attempt has been made to execute an emergency response plan. Following notification of the administrator, control proceeds to a "Write to Log" step 1217 in which an appropriate entry is made in a log file. Then, control proceeds to a "Finish Execution" step 1219 where the process is complete. In this particular scenario, the corresponding plan has not been executed because a proper code has not been entered.

If in step 1203, the system determines the user logged in and has the appropriate authorization, then control proceeds to a "Select Plan" step 1207 in which the user is able to select a specific emergency response plan from a list of defined plans, as illustrated above in conjunction with frame 600 (FIG. 6). Once the user selects a plan, control proceeds to an "Execution Confirmed?" step 1209 in which a "Confirmation" box (not shown) is displayed. The Confirmation box asks the user if he really wants to execute a plan and, if so, to click a button indicating this intention.

If the user does not confirm the plan execution, control returns to the Select Plan step 1207 in which the Execute Plan frame 600 is displayed and the user may, if desired, select the same or another plan. If the user confirms the intention to execute a chosen plan, then control proceeds to a "Prompt For Codes" step 1211 in which the user is asked to enter a particular code, or password, corresponding to the selected plan.

Control then proceeds to a "Proper Code?" step 1213 in which the HyperAlert system determines whether or not a proper code has been entered. If the user enters an incorrect code, then control proceed to the Notify Administrator step 1205, then to the Write To Log step 1217 and execution completes in Finish Execution step 1219, as described above. If the user enters the proper code, then control proceeds to a "Launch Control Center" step 1215 in which Execution Control Center 1100 (FIG. 11) is displayed with the name of the chosen plan displayed in data area 1111 and corresponding events and related information displayed in columns 1113, 1115 and 1117. Control then proceeds to an entry point A, which continues execution as described in conjunction with FIG. 13. Once a Execution Control Center 1100 has completed, as described in FIG. 13, control returns from an entry point B to Write To Log step 1217 and execution completes in Finish Execution step 1219.

Figure 13:
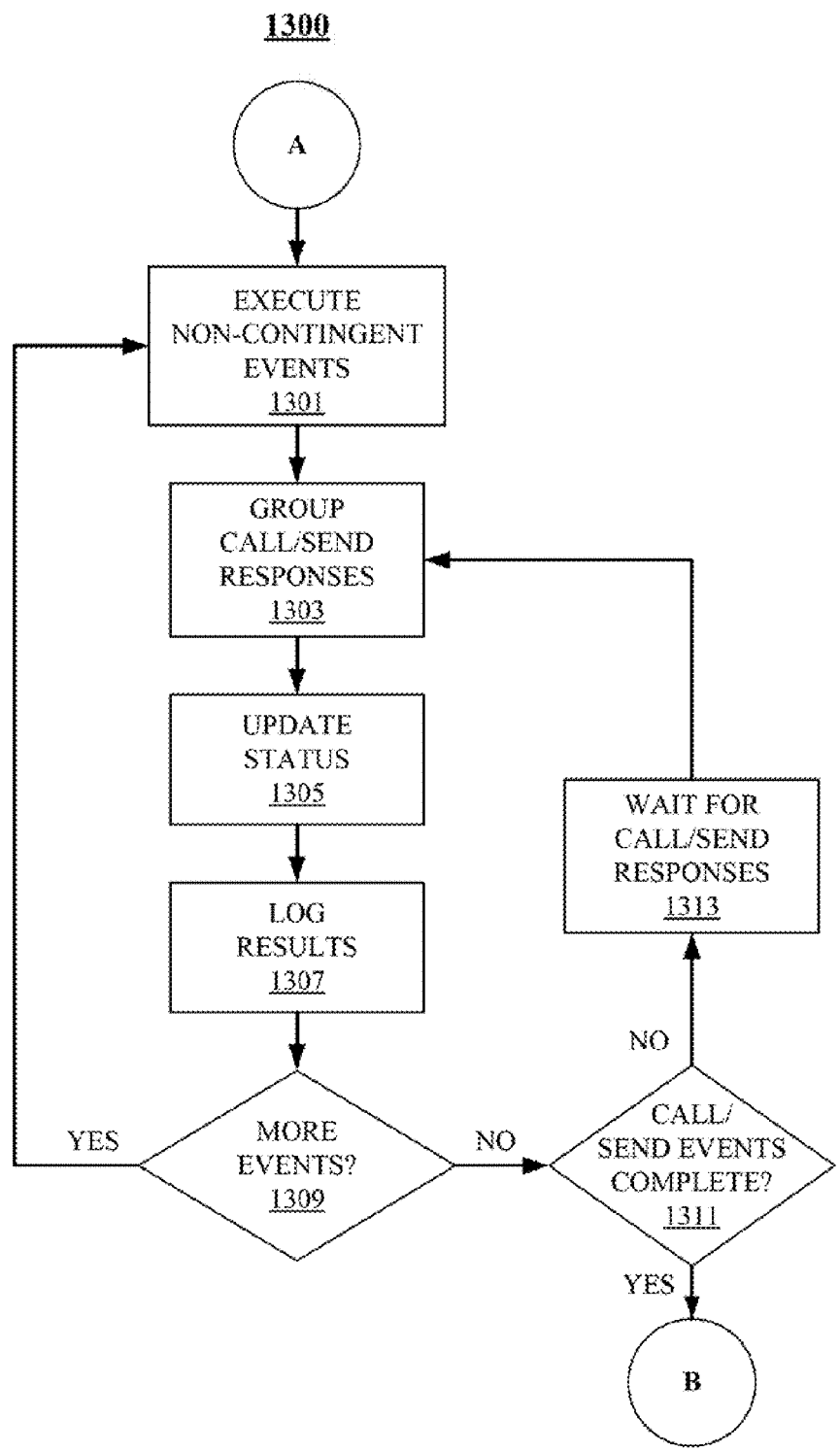
FIG. 13 is a flowchart illustrating the execution of events within an emergency response plan.

FIG. 13 is a flowchart 1300 illustrating the execution of events within an emergency response plan. Flowchart 1300 illustrates the overall control of all events associated with a particular plan; the execution of a single event is illustrated below in conjunction with FIG. 14.

Control begins at Entry point A (FIG. 12) and proceeds immediately to an "Execute Non-Contingent Events" step 1301 in which all events associated with the executed plan are themselves executed in the order they are listed in the plan, unless a particular event is contingent upon the completion of another event. It should be noted that typically a particular event does not need to complete before the next event in the plan's list is commenced. In this fashion, the execution of events takes place in a near simultaneous manner. Once all events have been commenced, control proceeds to "Group Call/Send Responses" step 1303 in which the results of execution of call/send events, based upon employee response or non-response, are grouped into one of the four (4) categories: Confirmed; Confirmed—Needs Assistance; Outstanding; and Outstanding—Off-Duty. Control then proceeds to an "Update Status" step 1305 in which status area 1119 of the Execution Deployment Center 1100 (FIG. 11) is updated to reflect personnel responses received. In addition, the HyperAlert system is updating the status of a corresponding location 249 by changing the status area 253 (FIG. 2), when displayed, from "green" to "red." In this example, only Confirmed and Outstanding responses are received and thus displayed in data areas 1123 and 1125 respectively of frame 1100 (FIG. 11).

Control then proceeds to a "Log Results" step 1307 in which the HyperAlert system records the results of all actions in a log file. Control then proceeds to a "More Events?" step 1309 in which the Hyper Alert system determines whether there are more non-contingent events to be executed. For example, there may be a contingent event waiting for indication that a "checkoff" response on a particular Manual event and the checkoff response has been received. If there are more events classified as non-contingent, then control returns to step 1301 and processing proceeds as described above. If there are no remaining non-contingent events then processing proceeds to a "Call/Send Events Complete? step 1311 in which the HyperAlert system determines whether or not required responses have been received for all outstanding Call/Send events or checkoffs have been received from so-defined Manual events. If all events are completed, control proceeds to entry point B, which as described above in conjunction with FIG. 12, proceeds to step 1217. If in step 1311 all events are not completed, then control proceeds to a "Wait For Call/Send Responses" step 1313 in which the HyperAlert system waits for outstanding responses for Call/Send events and, if necessary, checkoffs from corresponding manual events. Control then returns to step 1303 and processing resumes as before. It should be noted that when control returns again to step 1309, events contingent upon a Call/Send response or the receipt of a Manual event checkoff may have been reclassified as non-contingent.

Figure 14:
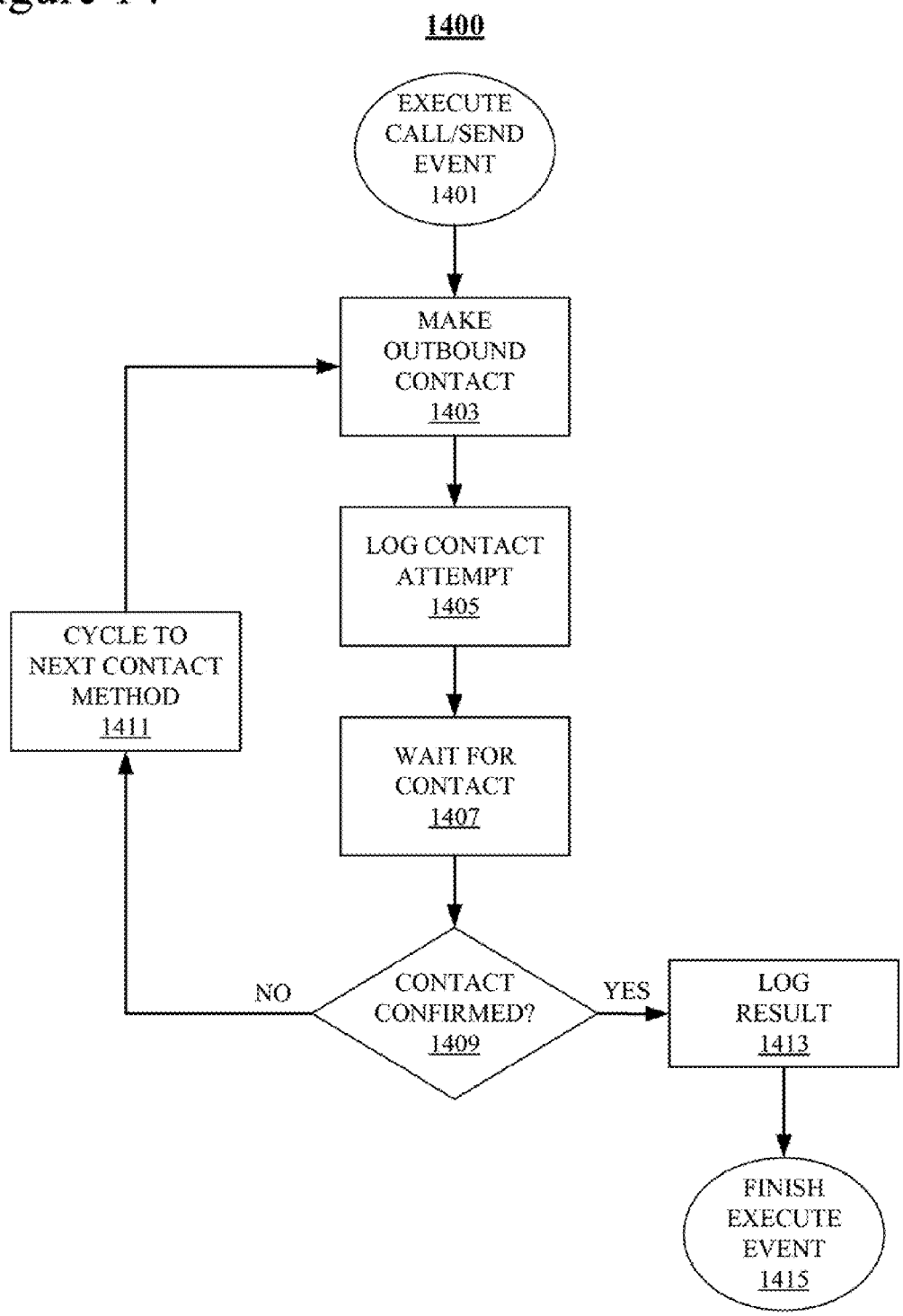
FIG. 14 is a flowchart illustrating the execution of a single, Call/Send event within an emergency response plan.

FIG. 14 is a flowchart 1400 illustrating the execution of a single, Call/Send event within an emergency response plan. Flowchart 1400 corresponds to the Execute Events step 1301 (FIG. 13) with regard to a single, Call/Send event in the executed plan. Control proceeds from an "Execute Call/Send Event" step 1401 to a "Make Outbound Contacts" step 1403 in which the call/send event is executed by contacting associated employees based on the information stored in their employee profile 900. The content of a message is determined by event details 409 or 509 (FIGS. 4 and 5), specifically the message fields 413 or 515, respectively. In one embodiment, a text message recorded in field 413 or 515 is converted to a voice message so that the outgoing message may be transmitted via POTS.

The particular employee or employees that a specific message is sent to is determined by the Send Message To fields 415 or 517, respectively. Control then proceeds to a "Log Contact Attempts" step 1405 in which information relating to the contact attempt(s) is stored in a log file. Control then proceeds to a "Wait For Contact" step 1407 in which the system allows a period of time to elapse for contacted employees to return a confirmation of a contact attempt. Call contact confirmation may, for example, take the form of keying in a specific, predefined code in response to the outgoing message or speaking a predefined response, which is then translated via voice processing technology. Those with skill in the art should recognize that there are multiple ways to implement both the contact and the confirmation.

Control then proceeds to a "Calls Confirmed?" step 1409 in which the system determines whether or not each individual attempted contact was successful, i.e. confirmations were received from those that required confirmation. If all attempted contacts are successful, then control proceeds to Log Result step 1413 and then a Finish Execute Event step 1415. If in step 1409 the system determines that all required confirmations have not been received, then control proceeds to a "Cycle To Next Contact Method" step 1411 in which a next alternative contact number or address is retrieved for any attempted contact in which confirmation was not received. Control then returns to Make Outbound Contacts step 1403 in which the alternative contact data retrieved in step 1411 is employed to reach the employee. Processing then proceeds as described above.

In an alternative embodiment, a "Public Access" module (not shown) is provided. A client may create a list of subjects and a public user can, using a web interface, register for notifications of events corresponding to a particular subject. For example, a bus company may list each of a number of different defined routes as a particular subject and provide information corresponding to the different subjects. A potential bus rider may then register to receive notifications about a particular route. Typically, the public user creates a profile that includes, but is not limited to, contact information and preferences and particular subjects of interest.

In one embodiment, notifications are automatically posted on informational web sites. Implemented as an add-on to the system, a particular notification is automatically sent to a dedicated and monitored electronic mail box. When the inbox detects a posting, the notification is automatically posted on the appropriate customer's website. This feature may be activated by a simple "Post-to-Website" check box (not shown) on the user interface screen.

While various embodiments of the application have been described, it will be apparent to those of ordinary skill in the art that many more embodiments and implementations are possible than are within the scope of this invention. For example, specific information fields within the information frames described above are used as examples only and other embodiments may add or subtract particular fields. In addition, alternative embodiments may use additional or fewer steps or execute the steps in a different order than described in the specification. Accordingly, the invention is not to be restricted except in light of the attached claims and their equivalents.

I claim:

1. A method, comprising:
defining one or more response plans, each response plan definition associated with at least one resource of two or more response resources;
specifying a first resource and a second resource, both of the plurality of resources, the specifying comprising:
defining an area on a map; and
correlating the defined area with either the first resource or the second resource;
selecting either the first resource or the second resource based upon the correlating; and
executing one plan of the one or more response plans, the executing comprising:
deploying the selected resource; and
displaying status information corresponding to the deployed resource.

2. The method of claim 1, wherein the one plan of the one or more plans comprises a notification of a particular event.

3. The method of claim 1, the correlating comprising calculating locations, based upon global positioning system (GPS) data, corresponding to the first and second resources.

4. A system of defining, managing and executing emergency response plans, comprising:
a processor;
a plurality of response resources;
categorizing the response resources into groups of response resources;
one or more response plans, each response plan associated with at least one group of response resources; and
logic, for execution on the processor, for executing one plan of the one or more response plans, the execution logic comprising:
logic for notifying a first resource of the at least one resource group associated with the one executed plan; and
logic for notifying a second resource of the at least one resource group in the event of a failure of the notifying of the first resource.

* * * * *